July 4, 1939.　　　D. F. TAYLOR　　　2,164,963
DISK HARROW
Filed April 23, 1938　　　3 Sheets-Sheet 1
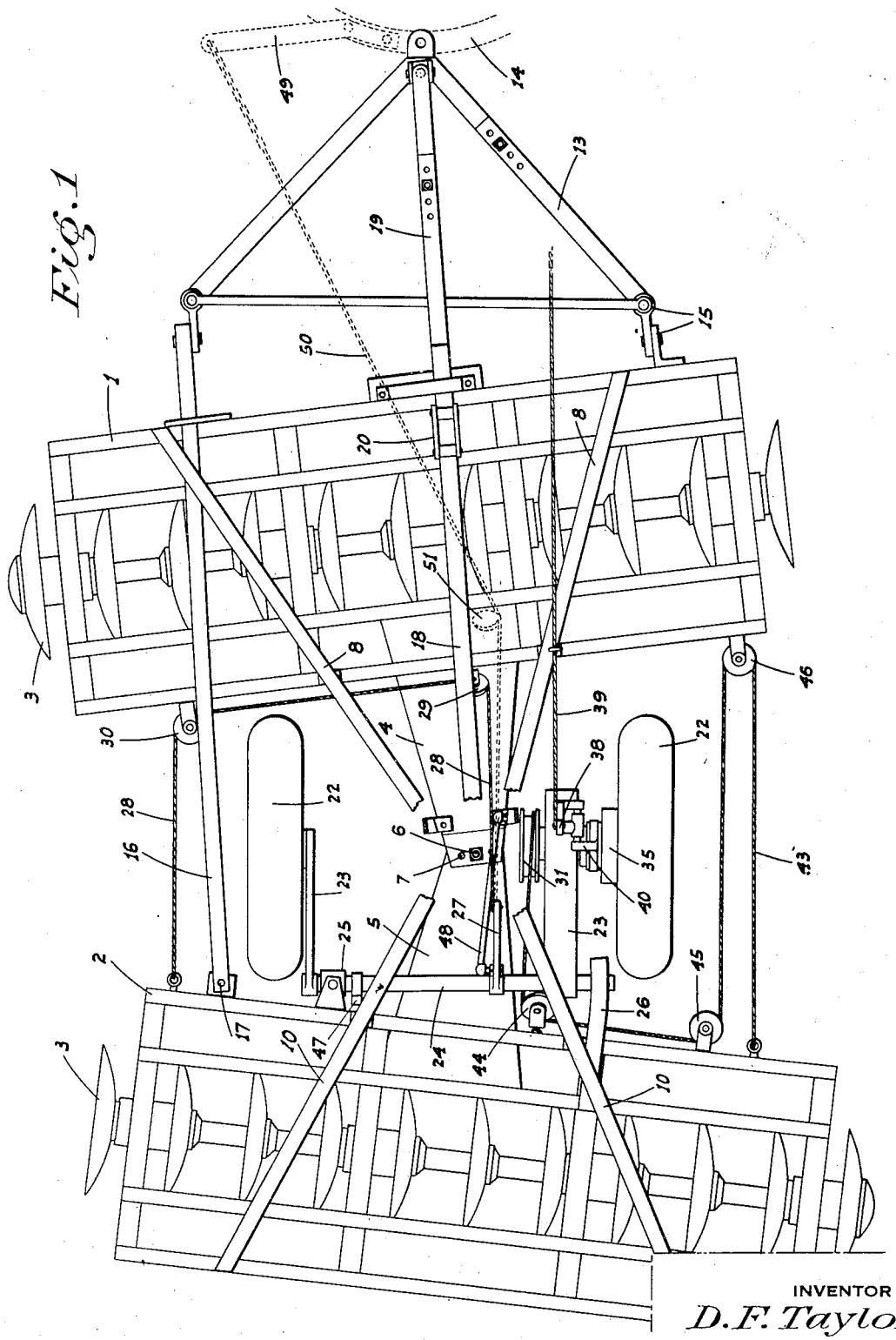
INVENTOR
D. F. Taylor
BY
ATTORNEY

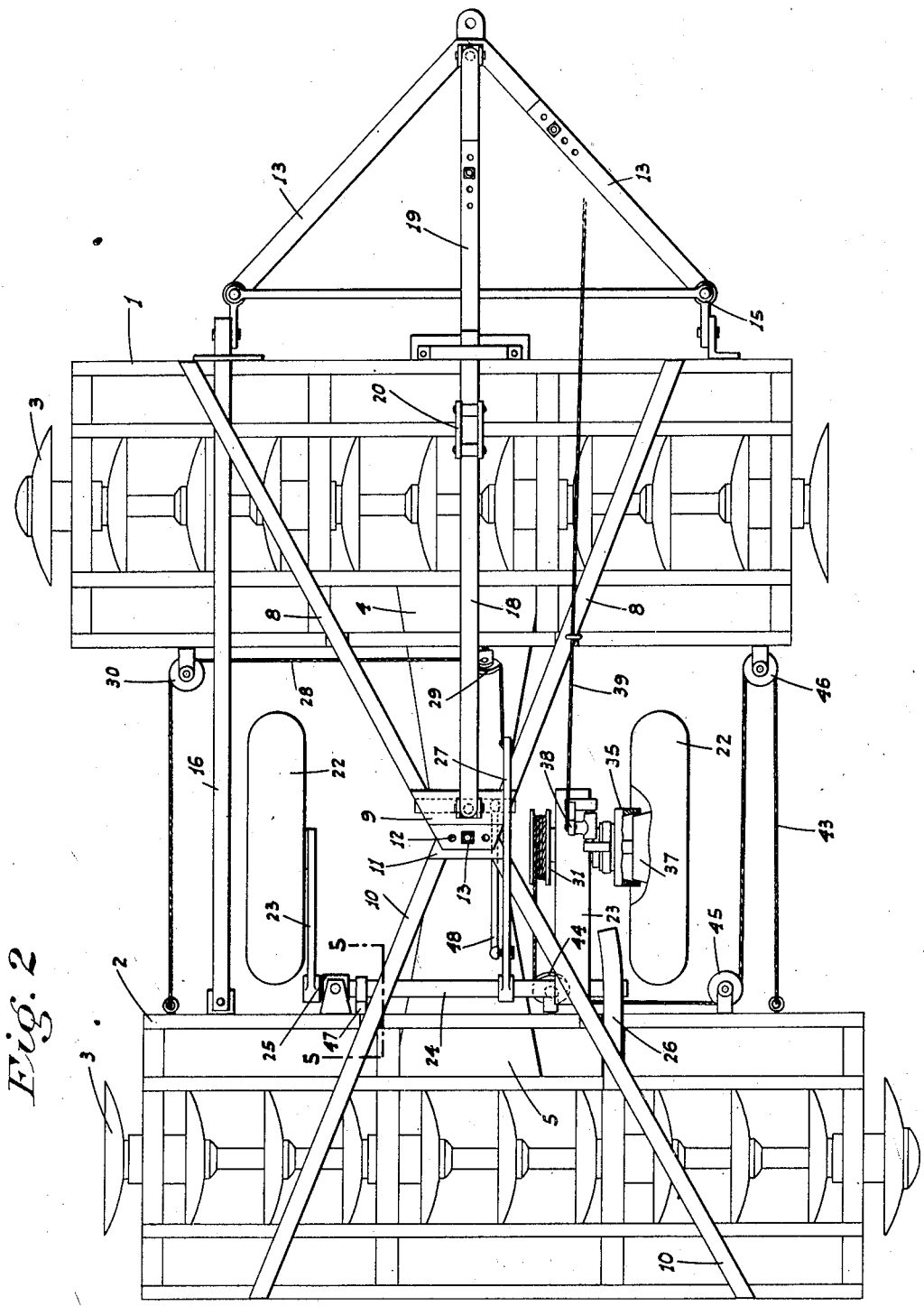

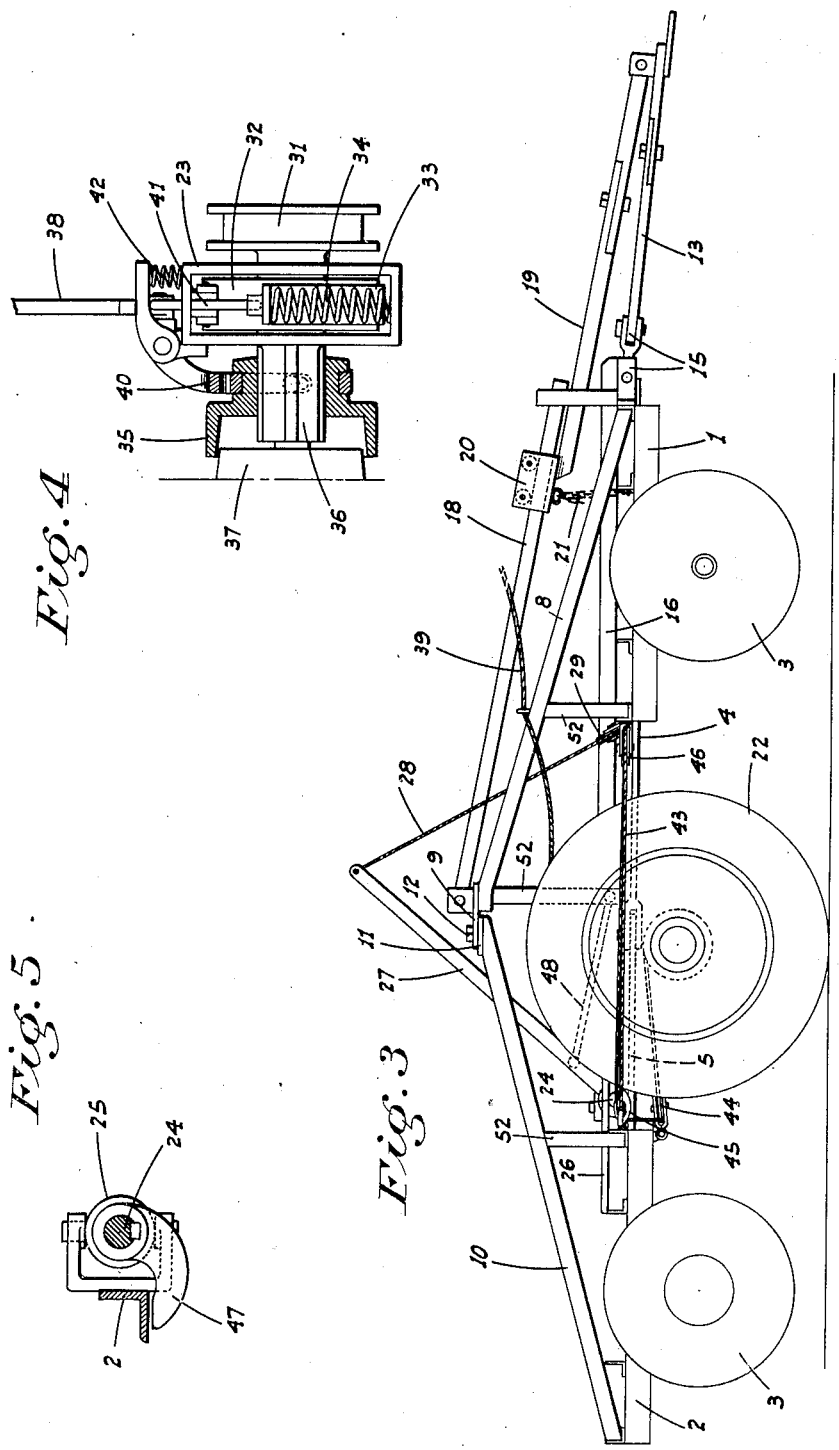

Patented July 4, 1939

2,164,963

UNITED STATES PATENT OFFICE 2,164,963

DISK HARROW

Donald F. Taylor, Hughson, Calif.

Application April 23, 1938, Serial No. 203,869

11 Claims. (Cl. 55—83)

This invention relates to disk harrows and particularly represents modifications over the harrow supporting structure shown in my Patent No. 2,114,549, dated April 15, 1938.

The operation of the patented structure required the use of a hydraulic mechanism. This necessitated the provision of a hydraulic pressure generating system on the tractor, which is somewhat costly.

The major object of the present invention is to provide a simplified form of harrow raising structure controlled by the rotation of the supporting wheels, thus doing away with the expensive hydraulic mechanism and making the device operable even when horse drawn, and bringing the same better within the means of the small operator.

This mode of control necessitates the wheels always riding on the ground, and a further object is to provide a swivelly mounted wheel truck, and to so control the swivel movement of the truck with the vertical and angling movement of the gangs that said truck normally "tracks" with the draft means.

Other differences in structure over the previous device will be apparent from the following specification.

These objects I accomplish by means of such structure and relative arrangement of parts as will fully appear by a perusal of the following specification and claims.

In the drawings similar characters of reference indicate corresponding parts in the several views:

Figure 1 is a top plan view of a tandem disk harrow with the gangs in working position.

Figure 2 is a similar view showing the position of the gangs as raised for transportation.

Figure 3 is a side elevation of the implement in transporting position.

Figure 4 is an end view of the hand controlled clutch and brake unit, partly in section.

Figure 5 is a fragmentary section on line 5—5 of Fig. 2.

Referring now more particularly to the characters of reference on the drawings, the harrow comprising front and rear gang frames 1 and 2 each supporting a row of disks 3. The front and rear frames are connected as a unit for relative angling movement by means of plates 4 and 5 respectively, which project toward and overlap each other and are pivoted by a king pin 6. A transverse row of holes 7 for the pin is provided in the plates, so that the lateral setting of the frames relative to each other may be altered, to correspondingly alter the relatively staggered relation of the disks.

Bracing beams 8, rigid with frame 1, extend rearwardly and upwardly in converging relation to each other from the front end of the frame to a termination at a gusset plate 9 overhanging pin 6. Similarly disposed and mounted beams 10 extend forwardly from the back end of the rear frame 2 to a termination in a gusset plate 11 underlying plate 9. These plates are provided with matching rows of holes 12, corresponding to the holes 7 and are connected by a king pin 13 through any selected pair of holes and always alined with pin 6.

The draft hitch for the harrow comprises a forwardly converging draft bar unit 13 adapted at its forward end for connection to the draw bar 14 of a tractor. On the right-hand side, the unit is swivelly connected to the front end of the forward frame 1 as at 15. On the left-hand side, the unit is similarly connected to the forward end of a bar 16 which extends over the front frame and is pivoted on the front end of the rear frame on the same side as at 17. The pull on the harrow is thus transmitted to the right-hand side of the front gang and to the left-hand side of the rear gang, thus equalizing the strains.

The hitch parts are arranged so that when the gangs are in parallel relation, the bar unit 13 is in symmetrical relation thereto as shown in Fig. 2. When however the gangs are angled, and the front gang is then turned toward the left, the draft bar unit is relatively turned toward the right, so that the line of draft still remains centered relative to the implement as a whole.

Another bar 18 is swivelly mounted on and extends forwardly from plate 9 and to a termination ahead of frame 1. Another bar 19 underlies and projects ahead of bar 18 to a swivel connection with draft unit 13 at its front end. Bars 18 and 19 are slidably connected together by a roller carriage 20 mounted on the rear end of beam 19. The draft unit, as before, may thus swing relative to the front frame when the implement is raised or lowered from a working to a transporting position or vice versa. When the harrow is raised, it is held from tilting as before by a chain 21 connecting the carriage with the frame 1.

Disposed between the gang frames to the sides of plates 4 and 5 are wheels 22, always riding on the ground. These wheels are supported by arms 23 projecting forwardly from a cross shaft 24 disposed near the front end of the rear gang frame. The shaft turns in a collar 25 disposed near the left wheel, which collar is supported from the rear gang frame for movement in a horizontal plane. A bar 26 overhangs the shaft near its right-hand end to relieve the swivel collar mounting of strains.

An arm 27 projects upwardly from shaft 24 and is connected to one end of a control cable 28. This cable extends downwardly to and about a pulley 29 fixed in connection with frame 1, then extends toward the left and passes over another pulley 30 fixed on said frame, and then passes back to an anchor on the rear frame 2. This cable is arranged so as to be taut when the wheels are relatively raised, and which is when the disks are lowered and angled. It will thus be seen that if the gangs are straightened out or moved to a parallel position, said frames at their left-hand side will become more widely separated. This will pull on the cable, pulling arm 27 down. This will lower arms 23, and since the wheels are already incontact with the ground, the harrow frames will be raised.

This straightening of the harrow frame is accomplished by the rotation of the right hand wheel 22 in the following manner: Mounted axially of but turnable relative to said wheel is a cable drum 31. This is fixed with a brake drum 32 disposed inside the adjacent arm 23 (which is hollow) and engaged by a band 33. This band is anchored at one end on said arm and its other end is normally maintained in braking engagement with the drum by a spring 34. A clutch element 35 is splined on a hub 36 projecting from the brake drum and normally clear of but adapted to engage a cooperating clutch element 37 fixed with the adjacent wheel 22.

A control lever 38, connected with a pull rope 39 extending to the operator on the tractor, is mounted on the arm 22 and is arranged in operative connection with a clutch shifting yoke 40 and a brake-spring releasing member 41 so that with an initial pull on the rope the brake is first released while a further pull on the rope, and a corresponding movement of the lever, the clutch is engaged. As soon as the pull on the rope is released, a spring 42 disengages the clutch and the spring 34 immediately resets the brake. It should here be noted that the above arrangement is only one example of the manner in which the brake and clutch action may be obtained, and if necessary separate controls for the brake and clutch may be used.

A cable 43 is wrapped about drum 31 from the top and extends rearwardly and about a pulley 44 fixed on rear frame 2. This cable then extends toward the right, about another fixed pulley 45, then forwardly to the front gang frame, about a pulley 46 fixed thereon, and then back to an anchor on the rear frame. This cable is arranged so as to be relatively unwrapped from the drum when the gangs are angled. Therefore when the clutch is engaged and the drum rotates, the cable is wrapped thereon. This decreases the spacing between the gangs on the right-hand side, and causes the cable 28 on the opposite side to be pulled to raise the gang frames as previously explained.

As soon as said frames have reached the desired height, the pull rope is quickly released, and the brake at once halts rotation of the drum, holding the harrow in its raised position. When it is desired to again lower the harrow, the pull rope is manipulated only sufficiently to release the brake whereupon the harrow drops of its own weight, the cable 43 of course unwrapping from the drum.

In order to prevent possible turning of the arms 23 down too far, in the event that the forward movement of the wheels is obstructed while the tractor continues to move forward, I may provide a suitable stop member 47 on shaft 24 near collar 25 to engage frame 2 when the arms 22 have swung down to a desired limit.

In order to cause the swivelly mounted wheel truck to remain substantially centered relative to the gang frames at all times, a swivelly mounted link 48 is connected to plate 4 and to arm 27 adjacent the shaft 24. This link not only functions to this end, but also prevents the pull on the truck induced by winding of cable 43 on the drum as well as ground resistance, from causing the truck to swing back against the rear gang frame.

In order to enable the harrow to be raised by a sharp turning of the tractor to the right, without manipulating the clutch or straightening the gangs, a lateral arm 49, projecting to the left, may be secured on the tractor bar 14. An adjustable pull cable 50 extends directly from this bar to the arm 27 over a direction changing pulley 51 on frame 1. In this manner, the turning of the tractor will cause the cable to be pulled, pulling down on arm 27 and raising the harrow frames.

It will be understood that the beams 8 and 10 are held rigid with the respective gangs thereunder as by vertical brace bars 52. The stiffening action of these diverging beams on the gangs prevents relative lateral tilting of the latter either when working or when raised and held suspended during transportation. The right-hand draft member 13, as well as the bar 19, are made adjustable as to length in order to enable the point of draft connection in a lateral plane to be altered.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a disk harrow, front and rear gangs spaced apart and connected together as a unit for relative angling in a horizontal plane, ground engaging wheels disposed between the gangs, means mounting the wheels in connection with the harrow for relative raising and lowering movement, means functioning with the straightening of the gangs from an angled position to relatively lower the wheels, and means operable by rotation of one wheel to thus straighten the gangs.

2. In a disk harrow, front and rear gangs spaced apart and connected together as a unit for relative angling in a horizontal plane, ground engaging wheels disposed between the gangs, means mounting the wheels in connection with the harrow for relative raising and lowering movement, means functioning with the straightening of the gangs from an angled position to relatively lower the wheels, normally inactive means operable by rotation of one wheel to straighten the gangs, and manually controlled means to place said inactive means in operation.

3. A structure as in claim 2, in which said normally inactive means includes a cable drum mounted axially of but normally turnable relative to one wheel, a normally set band structure associated with the drum; and said manually controlled means comprises a normally disengaged clutch between said wheel and the drum, a hand operated lever, and means to first release the brake and then engage the clutch with a continuous movement of the lever in one direction.

4. In a disk harrow, front and rear gangs spaced apart and connected together as a unit for relative angling in a horizontal plane, ground engaging wheels disposed between the gangs, means mounting the wheels in connection with the harrow for relative raising and lowering movement, means functioning with the straightening of the gangs from an angled position to relatively lower the wheels, a cable drum arranged in connection with one wheel, a cable extending from said drum to and connected between the gangs on the side of the harrow at which the gangs when angled are most widely spaced and arranged to pull said gangs together on said side when the cable is wound on the drum with the rotation of the latter, and manual means to connect the drum in driving relationship with said one wheel at will.

5. A structure as in claim 4, with means functioning automatically to prevent rotation of the drum when not in driving relationship with the wheel.

6. In a disk harrow, front and rear gangs connected together, means to connect the front gang to a tractor, wheels mounted in connection with the gangs for relative raising and lowering movement, and means between the wheels and the tractor to relatively lower the wheels with a sharp turning of the tractor to one side.

7. In a disk harrow, front and rear gangs connected together, means to connect the front gang to a tractor, a pair of wheels disposed between the gangs, a supporting frame for the wheels including arms extending rearwardly from the wheels and a transverse shaft connecting said arms and turnably mounted on the rear gang, an arm upstanding from the shaft, a cable extending forwardly from said upstanding arm and connected to the tractor at the rear and at a point thereon to the left of the point of draft connection with the harrow, and a direction changing pulley mounted on the harrow adjacent the arm and below the upper end thereof and about which the cable passes.

8. In a disk harrow, front and rear gangs connected together for relative angling in a horizontal plane, a wheel truck between the gangs, means mounting the truck on one gang for swivel movement in a horizontal plane, and connecting means between said truck and the other gang arranged to maintain the truck in substantially symmetrical relation with the gangs irrespective of the angled relation of the latter.

9. In a disk harrow, front and rear gangs connected together for relative angling in a horizontal plane, a wheel truck between the gangs, means mounting the truck adjacent one wheel on one gang for swivel movement in a horizontal plane, and a link swively connected to the other gang and to the truck at points such as to cause the truck to be maintained in substantially symmetrical relation with the gangs irrespective of the angled relation of the latter.

10. In a disk harrow, front and rear gangs, means pivoting the gangs together for relative angling movement in a horizontal plane, a draft unit including bars projecting forwardly in converging relation from the front gang and adapted at their forward end for connection to a tractor, means swively connecting the unit at its rear end and on one side on the front gang, adjacent one side thereof, a bar pivoted on the rear gang adjacent the opposite side thereof and extending forwardly to the other side of the draft unit at its rear end, and means pivoting the adjacent ends of said bar and unit together.

11. In a disk harrow, front and rear gangs, means pivoting the gangs together for relative angling movement in a horizontal plane, a brace unit for the front gang above the same and comprising a pair of bars rigid with said gang and extending upwardly in converging relation from laterally spaced points at the front of the gang to a termination above said pivot means, a similar brace unit extending forwardly from the rear end of the rear gang to a termination overlapping the rear end of the first named brace unit, and a pivot connection between said brace units axially alined with said pivot means.

DONALD F. TAYLOR.